United States Patent [19]

Yassa

[11] Patent Number: 4,991,404
[45] Date of Patent: Feb. 12, 1991

[54] VACUUM PRESSURE MONITORING SYSTEM

[76] Inventor: Emile Yassa, 4 Niagara Way, Morganville, N.J. 07751

[21] Appl. No.: 305,063

[22] Filed: Feb. 2, 1989

[51] Int. Cl.[5] .......................... F25B 49/00; G01L 9/00
[52] U.S. Cl. ........................................ 62/126; 62/129; 62/158; 340/626; 73/749
[58] Field of Search ................. 62/126, 127, 129, 158; 340/626; 73/747, 748, 749, 750

[56] References Cited

U.S. PATENT DOCUMENTS

| | | | |
|---|---|---|---|
| 2,475,069 | 7/1949 | Wood | 340/626 X |
| 2,714,168 | 7/1955 | Hencke et al. | 250/435 |
| 3,312,081 | 4/1967 | Berger et al. | 62/158 |
| 3,611,811 | 10/1971 | Lissau | 73/747 |
| 3,707,851 | 1/1973 | McAshan | 62/125 |
| 4,462,259 | 7/1984 | Stoltman et al. | 73/749 |
| 4,616,215 | 10/1986 | Maddalena | 340/626 |
| 4,631,960 | 12/1986 | Wogerbauer | 73/384 |
| 4,673,827 | 6/1987 | Sommer | 307/116 |

FOREIGN PATENT DOCUMENTS

| | | | |
|---|---|---|---|
| 1311383 | 10/1962 | France | 73/747 |
| 0145933 | 6/1988 | Japan | 73/747 |

OTHER PUBLICATIONS

Turck-High quality, solid state proximity sensors, switches and control systems (catalog) TPS 1-5/82.
Airserco U-Tube Manometers (Bulletin Nos. 4023, 4024) Model 2Z766B.
Air Line Mini-Filter (Installation Instructions & Parts Manual) Daytin Electric Mfg. Co.

Primary Examiner—Harry B. Tanner
Attorney, Agent, or Firm—Natter & Natter

[57] ABSTRACT

A vacuum pressure monitoring system includes a mercury manometer in communication with a vacuum line from an apparatus operating under high vacuum (approx. 0.25 in. Hg). A proximity sensor targets the height of the Hg. Incremental changes in the height of the Hg are detectable by the proximity sensor which triggers safety control components for alerting personnel and for protecting the apparatus.

15 Claims, 2 Drawing Sheets

VACUUM PRESSURE MONITORING SYSTEM

TECHNICAL FIELD

This invention relates generally to absolute pressure measurement and especially to a system for continuous monitoring of vacuum pressure in apparatus operating under high vacuum.

In particular, the monitoring system of this invention concerns remote automatic monitoring of vacuum pressure utilizing inductive sensing of a manometer and the activation of apparatus safety controls in response to low vacuum.

BACKGROUND ART

The continuous monitoring of vacuum pressure is critical for machinery operating under high vacuum and is of particular concern in the operation of absorption cold generator refrigeration systems such as employed in industrial and commercial air conditioning equipment. The typical absorption air conditioning system is charged with a lithium bromide solution which acts as an absorbent and employs water as the refrigerant. The lithium bromide has a strong affinity for water vapor. The refrigerant is supplied to an evaporator chamber and is sprayed over a bundle of tubes through which water passes and is chilled. The chilling takes place as a result of evaporation of water on the tube surface as it is absorbed by the lithium bromide. The heat needed for evaporation is taken from the water within the tubes thus lowering the temperature and producing the chilling effect. The weakened solution of lithium bromide is then pumped into a concentrator where the refrigerant vapor and absorbent solution is heated to release the refrigerant. The reconcentrated solution is then returned to the absorber and the water vapor is directed to a condensor where the refrigerant condenses into a liquid and returned to the evaporator thus completing the cycle.

The evaporator/absorption chamber is maintained at a low pressure, for example 0.25 in. mercury, (Hg), so that the boiling temperature of the refrigerant is sufficiently low to produce the desired chilled water temperature. It is also necessary to maintain a pressure within the evaporator/absorption chamber at or near absolute 0 in. Hg for operating the refrigeration system at maximum capacity.

A small differential in vacuum pressure thus directly effects the capacity and efficiency of the system. Furthermore, a precipitous low in vacuum pressure can result in crystallization of the lithium bromide solution.

Although there are control devices which have been designed to monitor refrigeration systems such as typically shown in U.S. Pat. No. 3,707,851, these devices do not automatically monitor vacuum pressure.

For precision measurement of vacuum pressure approximating absolute zero, a mercury tube manometer is preferred over a bourdon gauge. These instruments are conventionally read by visual observation of the liquid meniscus. In order to affect automatic pressure monitoring, indirect or remote reading is required. A previous attempt for remote reading included the use of a radioactive material which was floated on the mercury, as shown in U.S. Pat. No. 2,714,168. A disadvantage of that arrangement, especially as applied to vacuum pressure measurement, was that radioactivity could contaminate the system. Another device utilized an electronically recording manometer, as shown in U.S. Pat. No. 4,631,960 for providing atmosphere pressure readings. Such a device would not be suitable for use in a vacuum pressure environment.

BRIEF DESCRIPTION OF THE INVENTION

Briefly, the nature of this invention concerns a vacuum pressure monitoring system for accurately detecting incremental pressure changes.

The monitoring system provides for indirect automatic reading of the height of a column of mercury within a U-tube manometer without the need for visual observation by application of a proximity effect produced by an inductive interaction with the column of mercury.

A proximity sensor is incorporated within a safety control circuit. When vacuum pressure falls below a preselected level, as measured in inches or millimeters of mercury, the sensor is adapted to activate a relay for energizing peripheral components such as a visual indicator, an audible alarm, a low pressure occurrence counter, and relays for interrupting and/or terminating operation of the apparatus.

A time delay is built into the monitoring system to permit remedial corrective action prior to deactivating the apparatus.

A feature of this invention is that the monitoring system can be adapted for use with other equipment or manufacturing processes utilizing vacuum pressure especially if slight variations in pressure are critical to the operating system. For example, in the manufacturer of incandescent bulbs, in the operation of hospital apparatus, laboratory equipment requiring vacuum pressure and similar applications.

Another aspect of this invention is that when displacement of the mercury level from a predetermined height is detected, the proximity sensor automatically activates a relay for energizing peripheral components to prevent damage to the equipment.

In view of the foregoing, it should be apparent that the present invention overcomes many of the shortcomings and deficiencies of the prior art and provides an improved vacuum pressure monitoring system.

Having thus summarized the invention, it will be seen that it is an object thereof to provide a vacuum pressure monitoring system of the general character described herein which is not subject to the aforementioned disadvantages.

Another object of this invention is to provide a vacuum pressure monitoring system which utilizes a remote sensing device for reading manometer pressure.

A still further object of this invention is to provide a vacuum pressure monitoring system having a proximity sensing device for precise reading of a mercury level within a manometer.

Yet another object of this invention is to provide a vacuum pressure monitoring system wherein the sensing device is incorporated within a control circuit and activates relays for energizing peripheral safety components.

Still another object of this invention is to provide a vacuum pressure monitoring system compatible for use with an absorption cold generator refrigeration system.

Other objects of this invention will in part be apparent and in part will be pointed out hereinafter.

With these ends in view, the invention finds embodiment in certain combinations of elements and arrangements of parts by which the aforementioned objects and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown an exemplary embodiment of the invention.

DETAILED DESCRIPTION OF THE INVENTION

Figure 1:
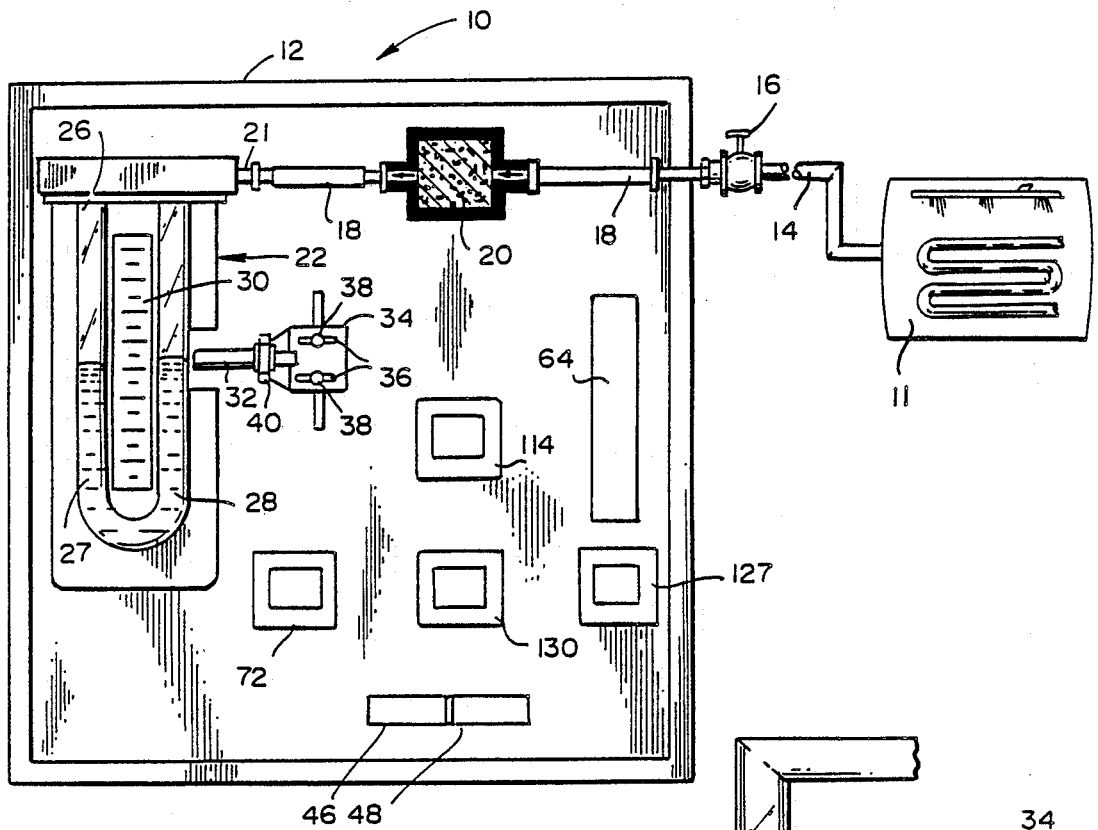
FIG. 1 is an elevational view of a control panel for a vacuum pressure monitoring system of this invention and illustrates a control panel containing a proximity sensor and a manometer.

Referring now in detail to the drawings, the reference numeral 10 denotes generally a vacuum pressure monitoring system in accordance with this invention. The system 10 as herein illustrated has been incorporated in a control panel 12 and will be discussed in conjunction with the monitoring of absolute vacuum pressure within an evaporator/absorption chamber 11 of a cold generator refrigeration system.

A vacuum line 14 from the absorption chamber 11 communicates with the monitoring system 10 through a coupling member 16. A tubular conduit 18 extending from the coupling member 16 interconnects the vacuum line 14 with a filter member 20 and then continues therefrom to an inlet port 21 of a manometer 22.

By way of illustration, the conduit 18 can be fabricated of a flexible rubber or nylon composition material. The filter 20, as shown herein is an Air Line Mini Filter, model No. 2Z766B as manufactured by Dayton Electric Manufacturing Co. The purpose of the filter 20 is to remove free moisture and solids in the conduit 18 and to prevent such contaminants from reaching the manometer 22. The manometer 22 is typically a U-tube mercury manometer such as manufactured by Meriam, Model No. 11AA 10WM (5 in. range Hg).

As shown in FIG. 1, the manometer 22 is vertically mounted within the control panel 12 and is constructed with a closed leg 26, and an open leg 28 and is filled with a column of mercury 27 (Hg) that balances in a vacuum system. A scale 30, calibrated in in. or mm Hg, provides graduations for visually reading the height of the column of mercury 27.

When the open leg 28 is connected to a vacuum system, such as in the absorption chamber 11, the mercury level in the two legs 26, 28 will approach each other. When the top of the curvature or meniscus of the mercury 27 in both legs 26, 28 is aligned adjacent the 0 mm mark on the scale 30, the pressure within the system will approach 0 mm Hg absolute or an almost perfect vacuum or "high vacuum".

In order to continuously monitor incremental variations of vacuum pressure, in the order of 2 mm, as required in industrial refrigeration systems, a proximity sensor 32 has been utilized.

The sensor 32 includes an oscillator which radiates a sensing field. When a target, such as the column of mercury 27, enters the sensing field, eddy currents are induced in the target. This effect changes the internal impedance of the oscillator which provides a useable output signal from the oscillator circuit. The oscillator circuit is used to drive a solid state electronic circuit which, in turn, activates a safety control circuit 33 as will be hereinafter described.

By way of example, the proximity sensor 32 utilized was manufactured by Allen Bradley, catalog No. C 5A 18 Series A; equivalent sensors such as manufactured by Truck could be used in substitution. As will be further explained, the sensor 32 functions in a normally closed or in a normally open mode and is triggered to open a relay when the height of the mercury 27 is displaced a predetermined increment.

Figure 2:
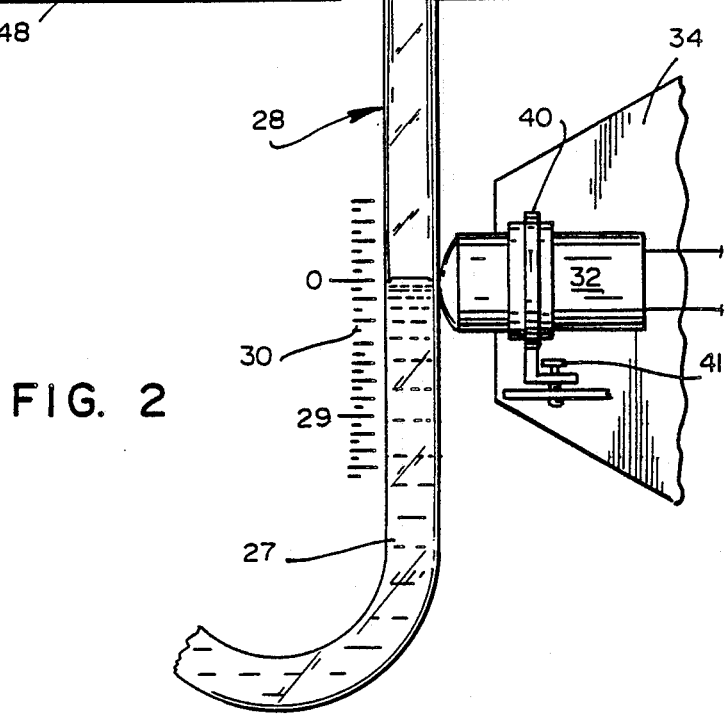
FIG. 2 is a partial sectional view, to an enlarged scale, and shows in detail, an adjustable mounting of the proximity sensor within the control panel.

The sensor 32 is mounted vertically within a control panel 12 and is focused or targeted on the meniscus of the mercury 27 in the open leg 28. A mounting bracket 34 is provided with a set of slots 36 which permit adjustable movement toward or away from the leg 28. A pair of set screws 38 or equivalent fastener devices secure the mounting bracket with respect to the manometer 22. It should be additionally noted that a mounting ring 40, as shown in FIG. 2, includes an adjustment screw 41 for height alignment the sensor 32. The proximity sensor 32 is positioned 3 to 5 mm from the leg 28 in order to achieve the necessary inductive interaction between the sensor 32 and the mercury 27.

Figure 3:
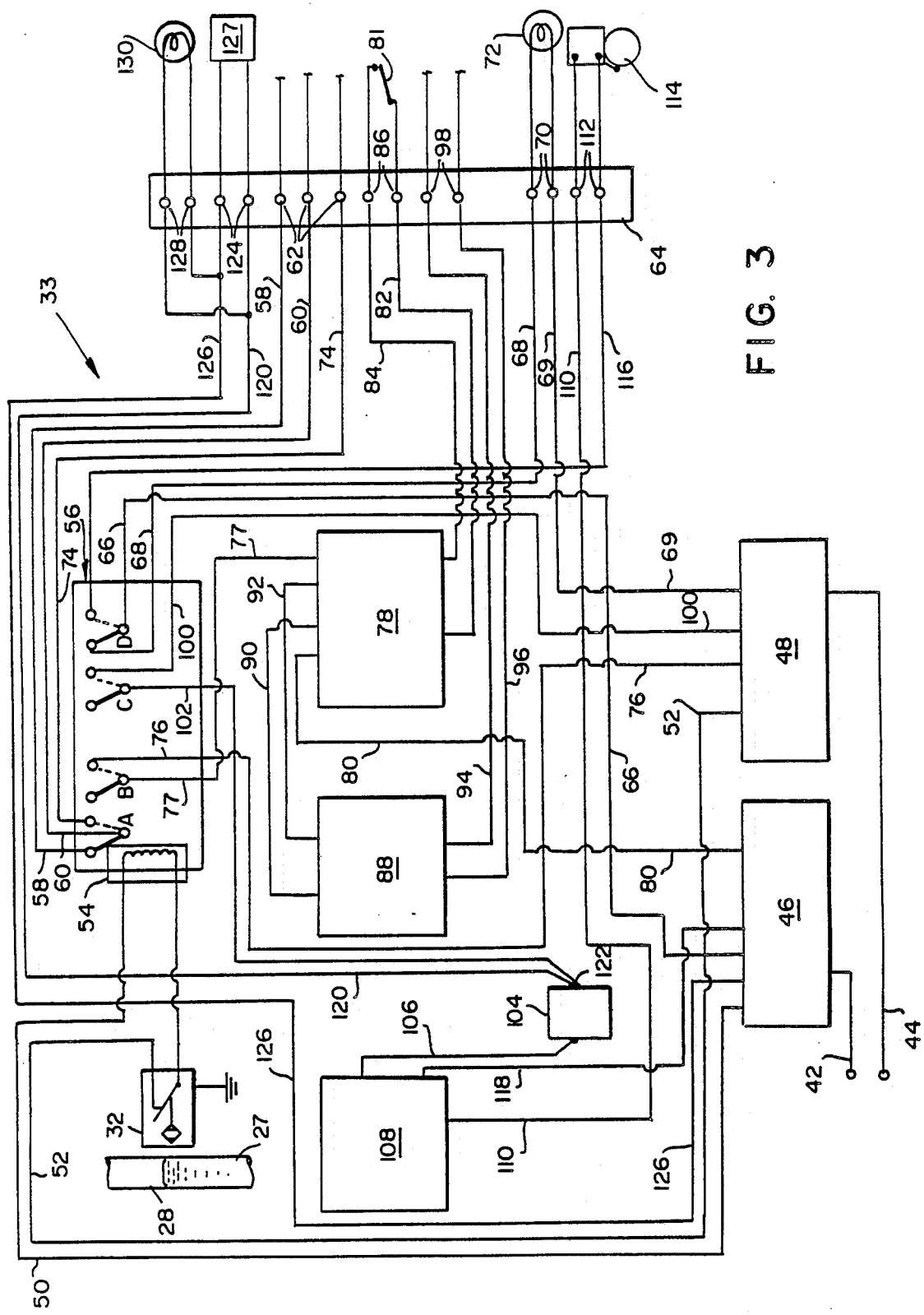
FIG. 3 is a diagram which illustrates the safety control circuit.

The operation of the safety control circuit 33 will now be discussed with reference to FIG. 3. The circuit 33 is energized by a 110 volt AC current. A "hot" line or a source of positive supply voltage 42 and a neutral or ground line 44 feed from a power source to respective terminal blocks 46, 48.

The proximity sensor 32 is supplied with a positive voltage through a line 50 and a line 52 is connected to the ground terminal block 48. In this preferred embodiment, the proximity sensor 32 is in a normally closed mode so that a relay 54 is energized. The relay 54 interacts with a master four pole, double throw relay 56. By way of example, the relay 56 can be a Truck, Model MR 34-3120X relay. As noted in FIG. 3, the relay 54 has poles A, B, C and D which are normally in the position illustrated by the solid line when the sensor 32 is in a closed mode and relay 54 is energized.

When the level of mercury 27 in leg 28 is at the 0 mm position on scale 30, the relay 54 will be energized and the pole A will connect a line 58 with a line 60, both of which lead to a set of peripheral contacts 62 positioned in a terminal block 64. The set of contacts 62 as will be noted, are not supplied with voltage and are intended as unpowered relay contacts for use with external or remote devices.

The poles B and C do not receive any positive voltage when the sensor 32 is in its normally closed mode. The pole D however, will receive a source of positive voltage through line 66. A line 68 connects pole D with a set of peripheral contacts 70 for energizing a "normal" vacuum panel indicating light 72. A line 69 grounds the panel light 72 to the terminal block 48 to complete the circuit.

When the column of mercury 27 is displaced under low vacuum conditions, the proximity sensor 32 assumes an open mode wherein the relay 54 is deenergized and the poles A, B, C and D of the master relay 56 switch to the respective positions as shown by the broken line.

The pole A, for example, will be connected to a line 74 which terminates at the contacts 62 in the terminal block 64. The pole B will now be connected to the ground terminal 48 through a line 76. A positive voltage passing through a line 77 is fed to a primary time delay relay 78 having a setable time delay of between 2 and 3 minutes. By way of further example, a relay model No. W211ACPSOX-61 manufactured by Magnecraft has been found to provide these capabilities. The relay 78 inturn, receives positive voltage through a line 80. It should be noted that a peripheral control switch 81 which is intended to effect operation of the absorption chamber 11 and typically can be the chiller electric/pneumatic air relay of a refrigeration system, is connected to the time relay 78 through lines 82, 84 which terminate at a set of contacts 86 within the terminal block 64.

In operation, if a low vacuum is detected, the preliminary control switch 81 will be energized by the time delay relay 78 after a preselected time frame such that a portion of the refrigeration process can be deactivated.

As a further safety precaution, a secondary time delay 88 is incorporated within the circuit 33. The time delay 88 is provided with a positive voltage through line 90 and is grounded through line 92. The time delay 88 can for example, be a model No. W211ACPSOX-62, manufactured by Magnecraft, having a 4-60 minute setable delay. The time delay 88 provides an output voltage through lines 94, 96 at a set of peripheral contacts 98 within the terminal block 64.

The purpose of the relay 88, is to deactivate the entire refrigeration system after preset time frame, for example, one hour after the primary relay 78 has been activated.

The pole C will next be discussed. The pole C is utilized for activating an audible alarm 114 and an occurrence counter 127 in response to low vacuum. A line 102 is selectively interrupted at a terminal 122 of an alarm silencer switch 104; the pole C is grounded through line 100. The silencer switch 104 is adapted for manual operation and when closed, current through a line 106 is fed from the switch 104 to a repeat cycle time delay relay 108 such as a Dayton Model No. 1A 368E unit, and then from the relay 108 through a line 110 to a set of peripheral contacts 112 in the terminal block 64. The contacts 112 include a line 116 leading to the pole D and thereafter connecting with the positive terminal block 46 through the line 66 for intermittently activating the audible alarm 114.

It should be noted that when the switch 104 is open, the time delay 108 and the alarm 114 are inactive. A line 120 which originates at the terminal 122 is connected to the terminal block 64 at a set of peripheral contacts 124. A source of positive voltage is supplied to the contacts 124 through a line 126. The occurrence counter 127, such as a Kramer type 635-636 relay, is employed for recording each instance of low vacuum.

In addition, the set of peripheral contacts 128 are connected in parallel with lines 120, 126 so that each time the occurrence counter 127 records low vacuum pressure, a panel indicator light 130 will be energized for signaling low vacuum.

It should thus be apparent that there is provided a vacuum pressure monitoring system which achieves the various objects of this invention and which is well adapted to meet conditions of practical use.

Since various possible embodiments may be made to the present invention or modifications might to made to the exemplary embodiments set forth, it is to be understood that all materials shown and described in the accompanying drawing are to be interpreted as illustrative and not in a limiting sense.

Having thus described the invention, there is claimed as new and desired to be secured by Letters Patent:

1. A pressure monitoring apparatus comprising manometer means for measuring high vacuum approximating absolute zero pressure within an absorption refrigeration system having a vacuum chamber, said manometer means including a column of mercury within a U-tube, said U-tue having two lets, a first leg being in communication with the vacuum chamber, a second leg being closed to the atmosphere, the mercury column being displaceable in response to pressure chambers within the vacuum chamber, proximity sensor means spaced from said mercury column in one of said legs for radiating a sensing field, said sensing field being adapted to detect displacement of the mercury column corresponding to low vacuum by inductive interaction with the mercury and to generate an output signal, and control circuit means actuated by the proximity sensor for energizing peripheral refrigeration system safety components when low vacuum is detected.

2. A pressure monitoring apparatus as claimed in claim 1 wherein the proximity sensor means includes oscillator means for radiating the sensing field, said sensing field being effective for inducing eddy currents within the mercury, said eddy currents further changing the internal impedance of the oscillator means to trigger the output signals.

3. A pressure monitoring apparatus as claimed in claim 2 wherein the column of mercury defines a meniscus and the proximity sensor is focused on the meniscus.

4. A pressure monitoring apparatus as claimed in claim 3 further including conduit means connecting said first leg of the manometer to said vacuum chamber, and filter means interposed within the conduit means for removing free moisture and solid contaminants.

5. A pressure monitoring apparatus as claimed in claim 4 wherein the proximity sensor is spaced approximately 3 mm. to 5 mm. from the first leg of the manometer.

6. A pressure monitoring apparatus as claimed in claim 5 wherein the proximity sensor is effective for detecting an incremental displacement of the mercury column in the magnitude of approximately 2 mm.

7. A pressure monitoring apparatus as claimed in claim 1 wherein the control circuit means includes a master relay, said master relay having plurality contact means for activating multiple peripheral safety components.

8. A pressure monitoring apparatus as claimed in claim 1 wherein the control circuit means includes relay means activated by the proximity sensor for activating switch means, said switch means being effective for energizing indicator means to provide a signal denoting low vacuum within the refrigeration system.

9. A pressure monitoring apparatus as claimed in claim 8 wherein the control circuit means includes time delay relay means and a preliminary control switch for temporarily interrupting operation of a portion of the refrigeration system after a predetermined time.

10. A pressure monitoring apparatus as claimed in claim 9 wherein the control circuit means further includes secondary time delay means for deactivating the entire refricateration system after a preset time frame.

11. A pressure monitoring apparatus as claimed in claim 9 further including counter means for cumulatively recording each occurrence of low vacuum as detected within the refrigeration system.

12. A pressure monitoring apparatus as claimed in claim 8 wherein the control circuit means includes an audible alarm and silencer switch means for selective deactivation of the audible alarm.

13. A vacuum control apparatus comprising manometer means for monitoring high vacuum approximating absolute zero pressure within a vacuum system, said manometer means including a column of mercury within a U-tube, said column of mercury defining a meniscus, said U-tube having two legs, a first leg being in communication with the vacuum system, a second leg being closed to the atmosphere, the mercury column being displaceable in response to pressure changes within the vacuum system, proximity sensor means mounted adjacent to one of said legs and focused on the meniscus for radiating a sensing field, said sensing field being adapted for detecting incremental displacement of the mercury column corresponding to low vacuum by inductive interaction and for generating an output signal.

14. A vacuum control apparatus as claimed in claim 13 wherein the proximity sensor includes oscillator means for radiating the sensing field, said sensing field being effective for inducing eddy currents within the mercury, with said eddy currents changing the internal impedance of the oscillator means for triggering an output signal.

15. A vacuum control apparatus as claimed in claim 14 wherein the proximity sensor is functionally operative in at least one of a normally closed or a normally open mode with the output signal being effective for switching the sensor from one of said modes to the other of said modes.

* * * * *